United States Patent
Tatemura et al.

(10) Patent No.: US 7,298,449 B2
(45) Date of Patent: Nov. 20, 2007

(54) LIQUID CRYSTAL DISPLAY APPARATUS AND METHOD FOR MANUFACTURING THE SAME

(75) Inventors: Makoto Tatemura, Yokohama (JP); Hideyuki Honoki, Yokohama (JP); Hiroko Hayata, Mobara (JP); Masanori Yuki, Mutsuzawa (JP); Keiichiro Ashizawa, Mobara (JP)

(73) Assignee: Hitachi Displays, Ltd., Mobara-Shi (JP)

(*) Notice: Subject to any disclaimer, the term of this patent is extended or adjusted under 35 U.S.C. 154(b) by 125 days.

(21) Appl. No.: 10/914,367

(22) Filed: Aug. 10, 2004

(65) Prior Publication Data

US 2005/0117106 A1 Jun. 2, 2005

(30) Foreign Application Priority Data

Sep. 30, 2003  (JP)  ............................. 2003-340627

(51) Int. Cl.
*G02F 1/1339* (2006.01)

(52) U.S. Cl. ...................... 349/155; 349/153; 349/157; 349/190

(58) Field of Classification Search ................ 349/153, 349/154, 155, 156, 157, 158, 160, 187, 190
See application file for complete search history.

(56) References Cited

U.S. PATENT DOCUMENTS

2002/0051112 A1* 5/2002 Katsura ..................... 349/153

2004/0032558 A1   2/2004 Liu

FOREIGN PATENT DOCUMENTS

| JP | 05-119325 | 5/1993 |
|----|-----------|--------|
| JP | 8-211351 | 8/1996 |
| JP | 8-211394 | 8/1996 |
| JP | 11-95228 | 4/1999 |
| JP | 2000-352720 | 12/2000 |
| JP | 2002-49045 | 2/2002 |
| JP | 2003-186023 | 7/2003 |
| JP | 2004-78142 | 3/2004 |

* cited by examiner

*Primary Examiner*—Toan Ton
*Assistant Examiner*—Tai Duong
(74) *Attorney, Agent, or Firm*—Antonelli, Terry, Stout & Kraus, LLP.

(57) ABSTRACT

A first transparent substrate and a second transparent substrate having such a plurality of protrusions on the liquid crystal layer side as to contact with the first transparent substrate are so fixed by means of a sealant that they bend convexly to the liquid crystal layer. Thus, it is possible to suppress the mura defect of a panel, which might otherwise be caused by the heat radiation from a back light when a liquid crystal display apparatus is driven.

14 Claims, 12 Drawing Sheets

FIG.13

LIQUID CRYSTAL DISPLAY APPARATUS AND METHOD FOR MANUFACTURING THE SAME

BACKGROUND OF THE INVENTION

The present invention relates to a structure of a liquid crystal panel to be mounted in a liquid crystal display apparatus, and a method for manufacturing the liquid crystal display apparatus.

A liquid crystal display apparatus is known as an In-plane-switching liquid crystal display apparatus in Japanese Patent Laid-open No. 2003-186023, for example. In this liquid crystal display apparatus, on the inner side face (i.e., the face on the side of a liquid crystal layer) of one of two opposite substrates with a liquid crystal layer between them, there are formed post spacers for retaining a cell gap from the other substrate.

SUMMARY OF THE INVENTION

In the liquid crystal display apparatus disclosed in the publication of the related art, however, when the liquid crystal layer between the two substrates expands with the heat coming from a back light, a variation in the thickness of the liquid crystal layer may occur to cause the mura defect.

Therefore, the invention helps provide a liquid crystal display apparatus which can suppress the mura defect.

According to one aspect of the invention, there is provided a liquid crystal display apparatus comprising: a first substrate including a first film formed; a second substrate confronting the first substrate and including a second film having first protrusions formed on a face facing the first substrate to contact with the first film; a frame-shaped sealant interposed between the first and second substrates and along the edges of the first and second substrates; and a liquid crystal layer enclosed by the frame-shaped sealant and formed in regions between the first and second films. The sealant fixes the first and second substrates such that the first substrate bulges toward the liquid crystal layer.

According to the invention, it is possible to suppress the mura defect effectively during the operation of the liquid crystal display apparatus.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENTS

An embodiment of the invention will be described with reference to the accompanying drawings.

First of all, a liquid crystal display apparatus according to the embodiment will be described in the following.

Figure 4:
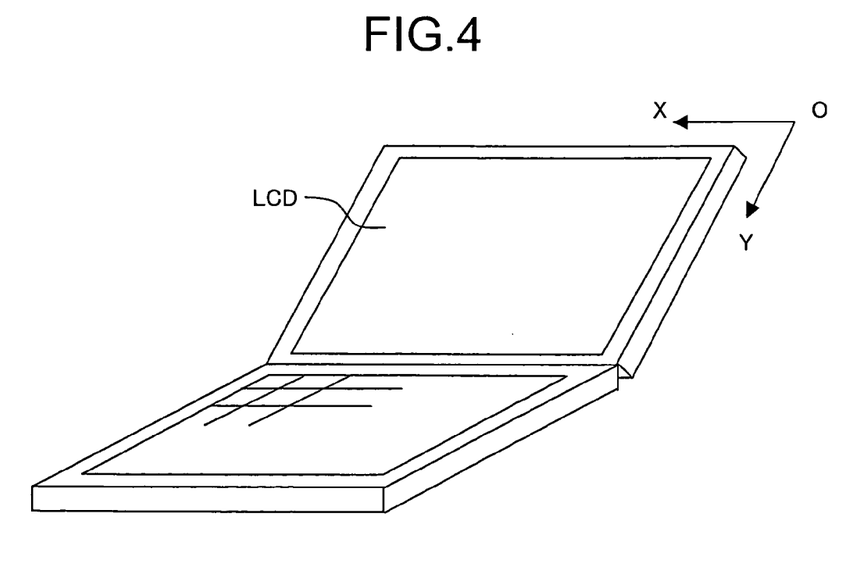
FIG. 4 is a sketch drawing for explaining a liquid crystal display apparatus according to the embodiment of the invention.

The image display apparatus according to the embodiment is provided with a liquid crystal panel LCD, which displays an image, as shown in FIG. 4.

Figure 1:
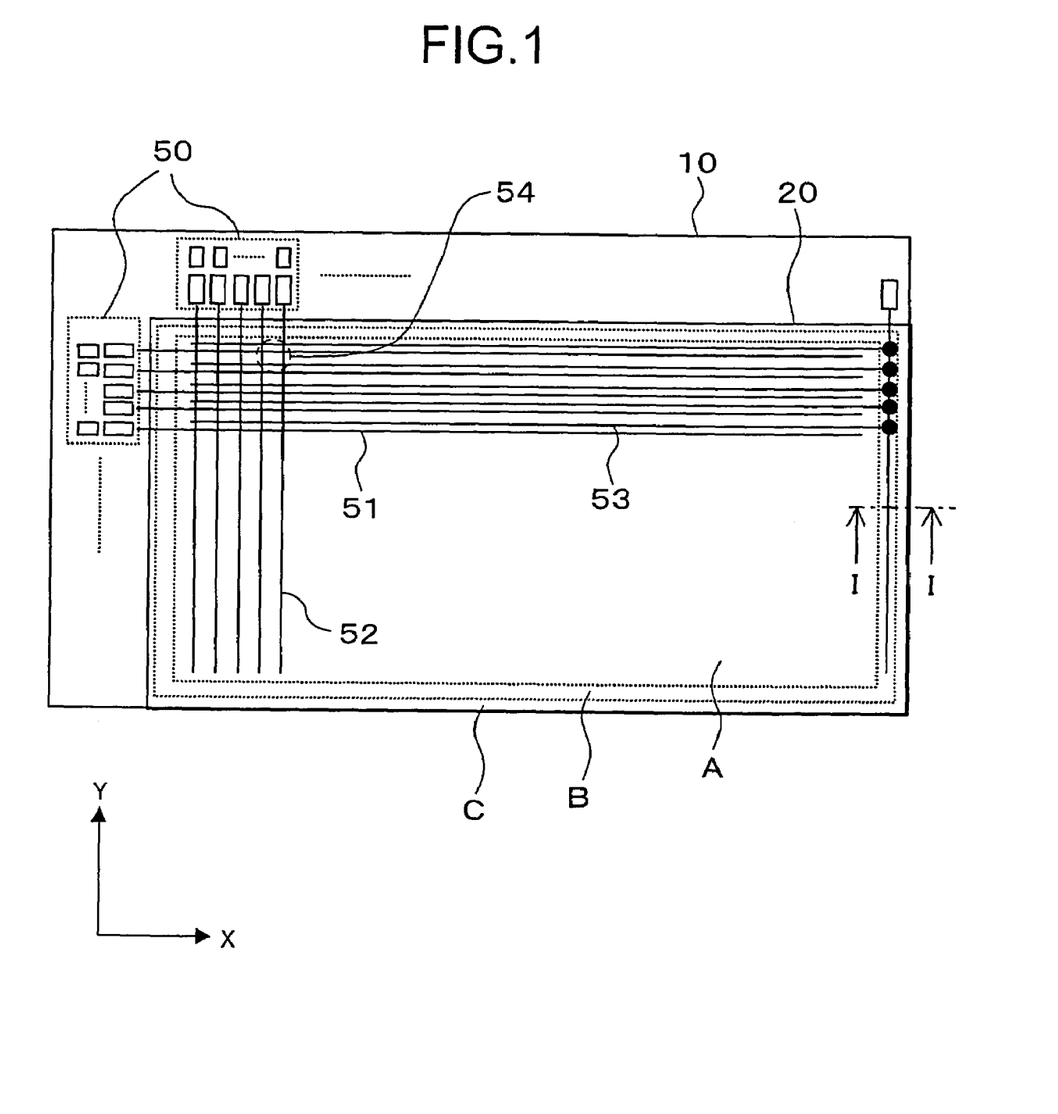
FIG. 1 is an explanatory view, in which an equivalent circuit is added to a front elevation of a liquid crystal panel according to an embodiment of the invention.
Figure 2:
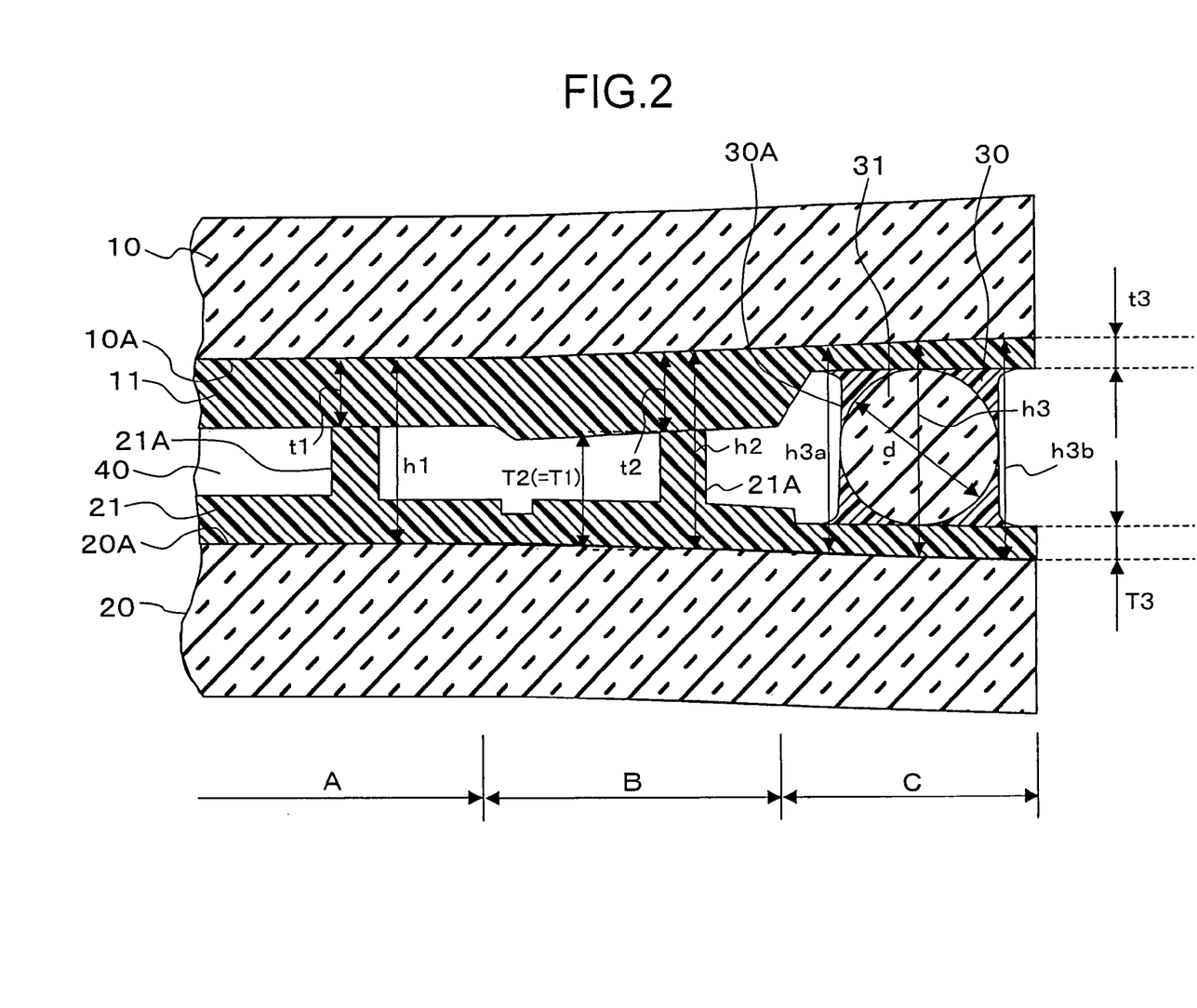
FIG. 2 is a schematic section for explaining an enlarged structure of section I-I in FIG. 1.

As shown in FIG. 1 and FIG. 2, this liquid crystal panel LCD includes: a pair of opposite transparent substrates (of glass, plastics or the like) 10 and 20; a sealant 30 which fixes the frame-shaped edge region in the inner face (i.e., the face on the side of the substrate 20) 10A of the transparent substrate 10 on the inner face (i.e., the face on the side of the substrate 10) of the other transparent substrate 20; drivers (or terminals, to which signals from a driver chip are inputted) 50 formed in the edge regions along two sides of the inner face of one transparent substrate 20; and a liquid crystal 40 which is sealed between the transparent substrates 10 and 20.

In the sealant 30, there are fitted fibers (e.g., glass fibers) 31 of a suitable diameter, which extend along the sealant 30 so as to control the spacing between the inner faces 10A and 20A of the transparent substrates 10 and 20.

At least one of the paired transparent substrates 10 and 20 is fixed on the sealant 30 so that it stay a state in which it has been bended convexly to the liquid crystal 40 by the pressure applied at a substrate assembling step. Specifically, the sealant 30 existing on at least one of the four sides of the liquid crystal panel constrains the edge portions of the transparent substrates 10 and 20 so that the spacing between the inner sides 10A and 20A of the transparent substrates 10 and 20 may become gradually narrower from the edges of the transparent substrates 10 and 20 toward a interface 30A between the sealant 30 and the liquid crystal layer 40 (i.e., so that the spacing may satisfy the following Relation (1)):

$$h3a < h3b \tag{1}$$

Here, h3*b* designates the spacing between the inner faces 10A and 20A at the edge position of the transparent substrates, and h3*a* designates the spacing between the inner faces 10A and 20A of the transparent substrates at a position closer to the interface 30A between the sealant 30 and the liquid crystal layer 40 than the edge position of the transparent substrates.

As shown in FIG. 2, one transparent substrate 10 of the two transparent substrates is provided on its inner face 10A with a multi-layered film 11 including a color film, and the other transparent substrate 20 is provided on its inner face 20A with a multi-layered film 21 containing the TFTs. Here, the structures of the multi-layered films 11 and 21 are omitted in FIG. 2.

The multi-layered film 21 of one transparent substrate 20 is provided with a plurality of protrusions 21A which function as a spacer for restricting the deformations of the transparent substrates 10 and 20 toward the liquid crystal 40, in image display regions A (i.e., the regions in which pixel regions 54 enclosed by drain lines 51 and gate lines 52 and passed by common electrode signal lines 53 and a color filter exist in a matrix shape so that the image is displayed by the transmission of light) and in an image non-display regions B (i.e., the regions which are located between the image display regions A and the sealant 30 so that the image is not displayed). Moreover, the multi-layered film 11 of the other transparent substrate 10 is so formed that a film thickness t1 at positions facing the individual protrusions 21A in the image display regions A is smaller than a film thickness t2 at positions facing the individual protrusions 21A in the image non-display regions B.

Here, the plural protrusions are formed on the multi-layered film 21 containing the TFTs and the thickness of the multi-layered film 11 including the color filter layer is made smaller in the image display regions A than in the image non-display regions B. However, it is not necessary to do so.

For example, to the contrary of FIG. 2, the plural protrusions may be formed on the multi-layered film 11 including the color filter layer, and the thickness of the multi-layered film 21 containing the TFTs may be smaller in the image display regions A than in the image non-display regions B. Moreover, the protrusions in the image non-display regions B and the image display regions A may also be formed on the multi-layered film 11.

The thicknesses of those multi-layered films 11 and 21 have the following Relations (2):

$$t1+T1<t2+T2<t3+d+T3 \qquad (2).$$

Here:

T1: the thickness of the multi-layered film 21 at the protrusion positions in the image display regions A;

T2: the thickness (=T1) of the multi-layered film 21 at the protrusion positions in the image non-display regions B;

T3: the thickness of the multi-layered film 21 in regions C forming the sealant 30;

d: the diameter of the fibers 31; and t3: the thickness of the multi-layered film 11 in the regions C forming the sealant 30.

As a result, the spacing between the inner faces 10A and 20A of the transparent substrates 10 and 20 is so gradually narrowed from the edges of the transparent substrates 10 and 20 toward the image display regions A as to satisfy the following Relations (3), and is substantially constant in the image display regions A:

$$h1<h2<h3 \qquad (3).$$

Here:

h1: the spacing in the image display regions A between the inner faces 10A and 20A of the transparent substrates 10 and 20;

h2: the spacing in the image non-display regions B between the inner faces 10A and 20A of the transparent substrates 10 and 20; and h3: the spacing in the regions C forming the sealant 30 between the inner faces 10A and 20A of the transparent substrates 10 and 20.

The structure thus made can suppress the variation in the thickness of the liquid crystal layer 40 for the following reasons so that it can prevent the mura defect, as might otherwise be caused by the heat coming from a back light.

Figure 3:
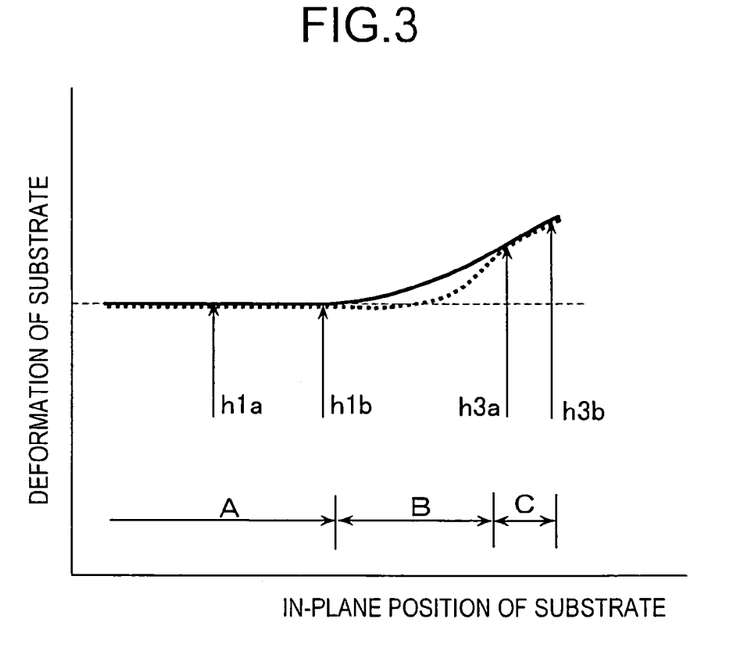
FIG. 3 is an explanatory diagram illustrating a deformation of a transparent substrate of the liquid crystal panel according to the embodiment of the invention.

Under pressure applied at the substrate assembling step, the individual transparent substrates 10 and 20 are deformed convexly toward each other using the fibers 31 of the sealant 30 in the regions C as a support point, as indicated by a broken curve in FIG. 3. However, this deformation is restricted at the positions of the protrusions in the image display regions A and in the image non-display regions B. As the sealant 30 becomes hardened, the edge portions of the two transparent substrates 10 and 20 are restrained while keeping their shapes under pressure by the sealant 30. As a result, the two transparent substrates 10 and 20 put the forces in the directions to compress the protrusions 21A to each other, after the pressure is released.

As indicated by a solid curve in FIG. 3, therefore, the variation in the positions of the inner faces of the transparent substrates within the image display regions A is suppressed, so that variation in the thickness of the liquid crystal layer 40 can be resultantly suppressed.

In the image non-display regions B in which the spacing between the inner faces 10A and 20A of the two transparent substrates 10 and 20 are larger than in the image display regions A, the multi-layered film 11 of the transparent substrate 10 is accordingly thicker. In the image non-display regions B, therefore, the multi-layered film 11 of the transparent substrate 10 will not be excessively away from the protrusions 21A of the multi-layered film 21 of the transparent substrate 20. As a result, the thickness fluctuation in the liquid crystal film 20 can be prevented, which is caused by the partial deformation of the transparent substrate, even if the image non-display regions B are touched by the user, for example.

In a case the percentage of width of the image non-display regions B to that of the image display regions A is equal or smaller than a predetermined value, it is not necessarily essential that the thickness of the multi-layered film 11 be made larger in the image non-display regions B than in the image display regions A.

According to the liquid crystal panel of this embodiment, therefore, the mura defect can be suppressed, as described above.

A method for manufacturing a liquid crystal panel having such structure above will be described.

Figure 13:
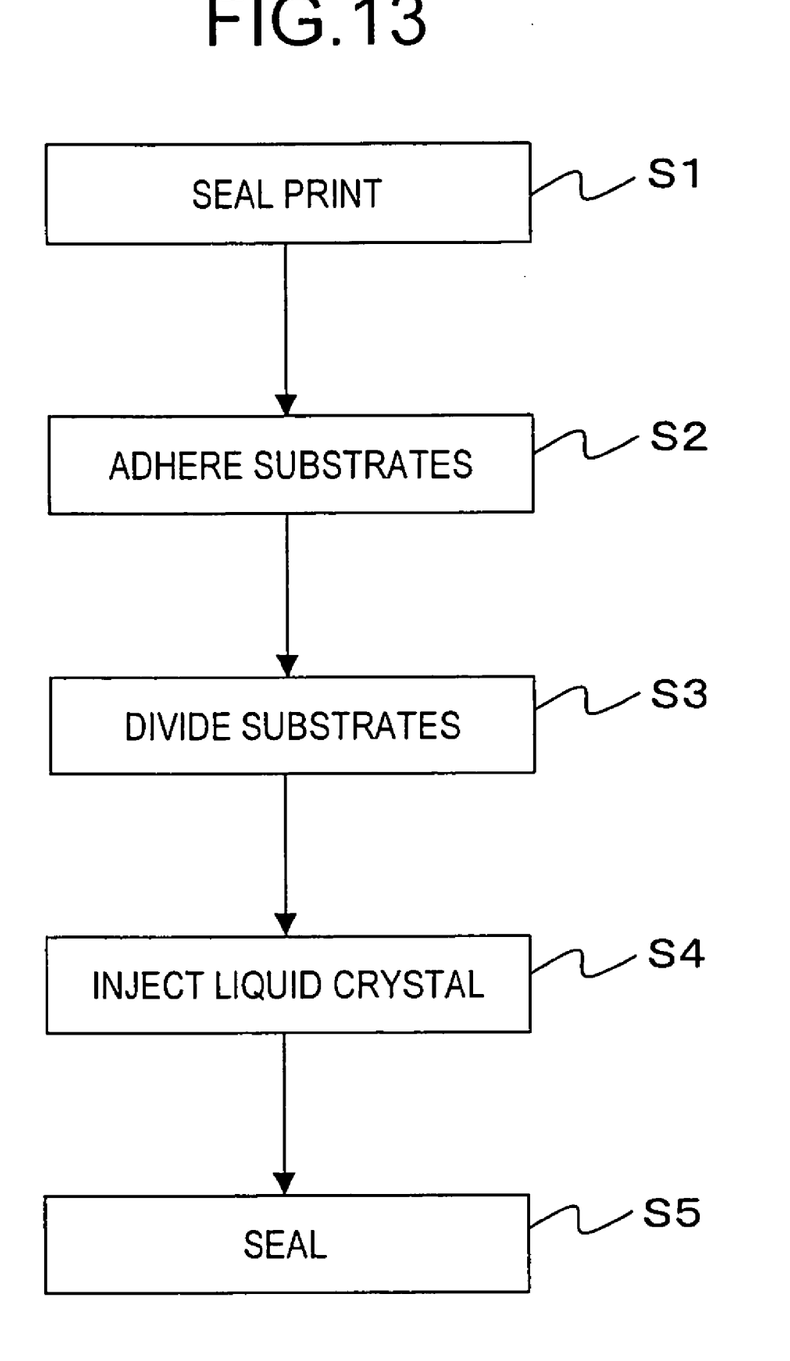
FIG. 13 is a flow chart showing the process for manufacturing a liquid crystal display apparatus according to the embodiment from a sealant printing step to a sealing step.

FIG. 13 is a flow chart showing a process for manufacturing a liquid crystal display apparatus having the liquid crystal panel of FIG. 1 and FIG. 2, from a sealant printing step to a sealing step.

Figure 5:
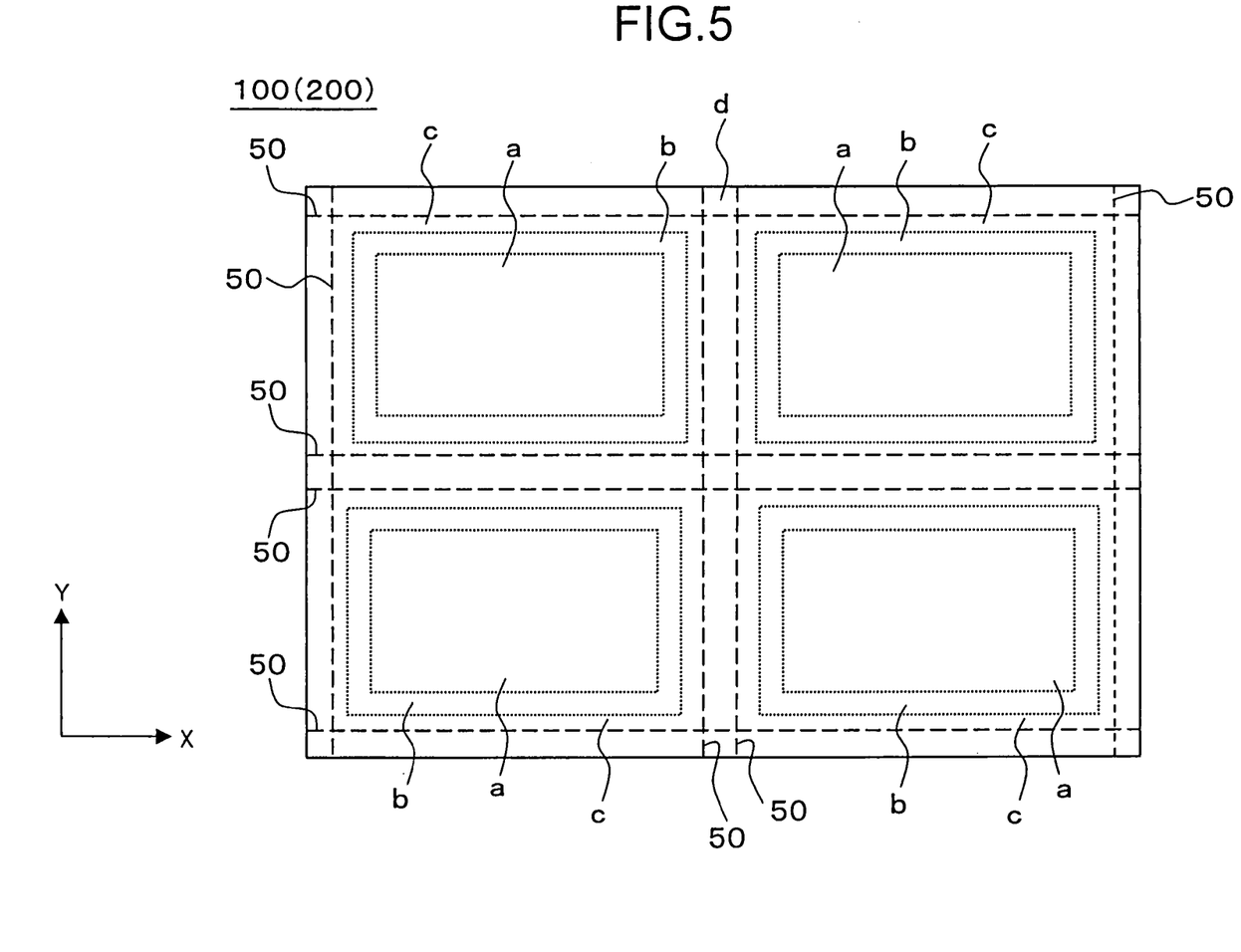
FIG. 5 is a front elevation for explaining a mother substrate, in which areas for the individual regions of the liquid crystal panel are shown by virtual lines.

Two transparent substrates (hereinafter, called to as "mother substrates") 100 and 200 capable of taking the one-side substrates for the four liquid crystal panel are prepared, as shown in FIG. 5, and are subjected to a predetermined pretreatment such as a rinsing treatment to these mother substrates 100 and 200. In FIG. 5: broken lines 50 designate cutting plane lines for defining the regions (hereinafter, called to as "panel regions") to become one-side substrates of the individual liquid crystal panels; regions d other than the panel regions are the regions (hereinafter, called to as "cut regions") to be cut off at a panel cutting step; regions a in the individual panel regions are the regions to become the image display regions A of the individual liquid crystal panels; regions b are the regions to become the image non-display regions B of the individual liquid crystal panels; and regions enclosing the regions b in the individual panel regions are the regions to become the sealant forming regions C of the individual liquid crystal panels.

Here, the dotted lines and the broken lines shown in FIG. 5 are virtual lines which are not actually formed in the mother boards. Moreover, here is enumerated an example, in which the four transparent substrates for the liquid crystal panels are taken from the mother substrates 100 and 200. The number of the substrates to be taken from the mother substrates 100 and 200 are determined according to the aspect ratios of the mother substrates 100 and 200 and the aspect ratios (or the screen sizes) of the liquid crystal panels.

Figure 6:
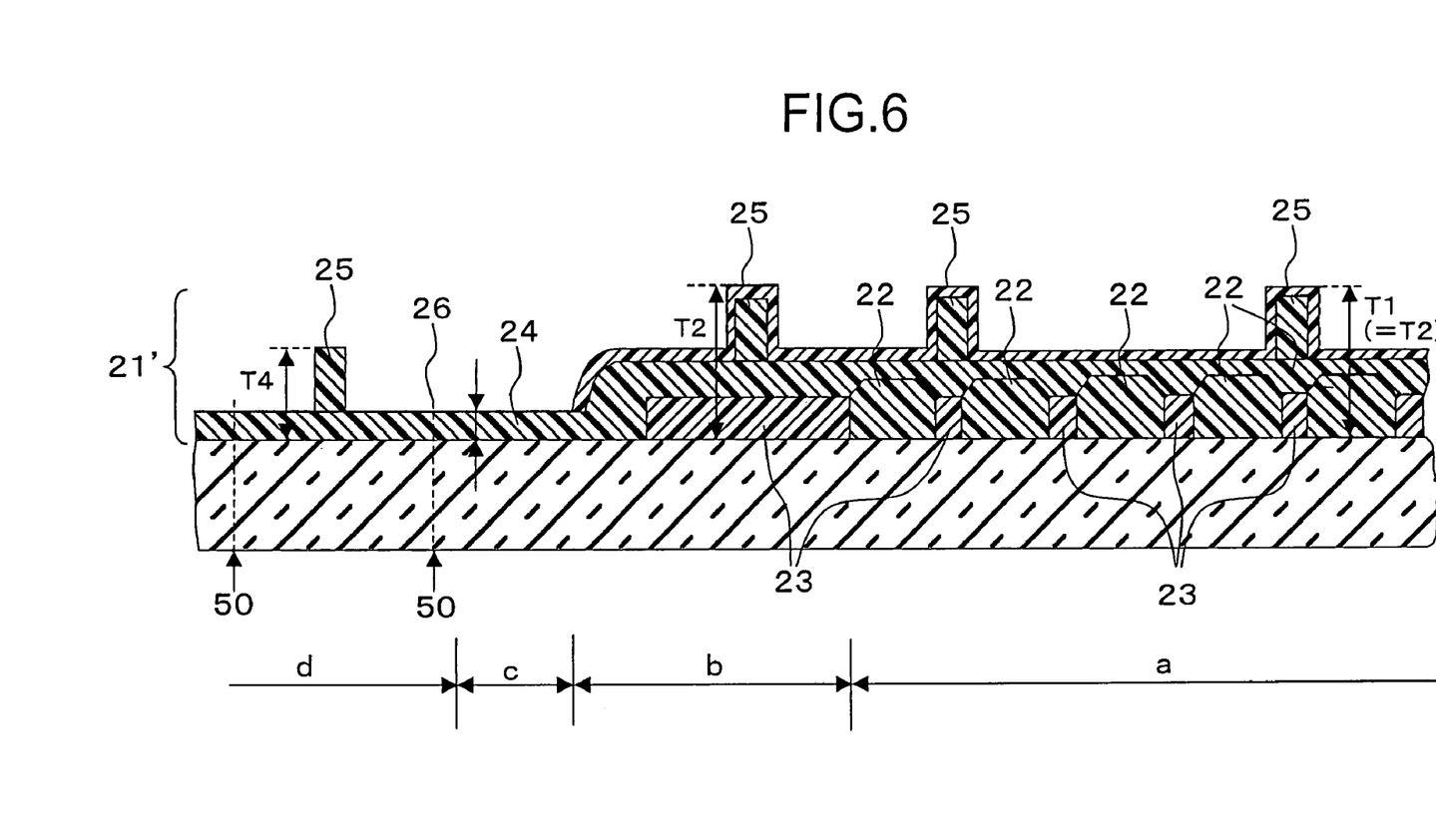
FIG. 6 is a section for explaining a section of a portion of the mother substrate.

On the one-side face (hereinafter, called to as "pattern forming face") of one mother substrate 200, there is formed a multi-layered film 21', as shown in FIG. 6. This multi-layered film 21' is composed of: (1) RGB color filter films 22 disposed for individual sub-pixels in the individual regions a; (2) grid-shaped black matrix films 23 formed in the individual regions b between the color filter films 22; (3) an overcoat film 24 covering the pattern forming face side of the mother substrate 200 entirely as the upper layer film above the black matrix films 23 and the color filter films 22; (4) post-shaped films 25 of an organic substance (or an inorganic substance) formed at positions confronting the black matrix films 23 across the overcoat film 24 and at positions in the cut regions d; and (5) an alignment layer 26 covering the overcoat film 24 in the regions a and b.

This multi-layered film 21' includes the plural post-shaped films 25 so that a surface of the multi-layered film 21' protrudes at the positions of the individual post-shaped films 25 toward the mother substrate 200 by a height T0 of the individual post-shaped films 25.

Figure 7:
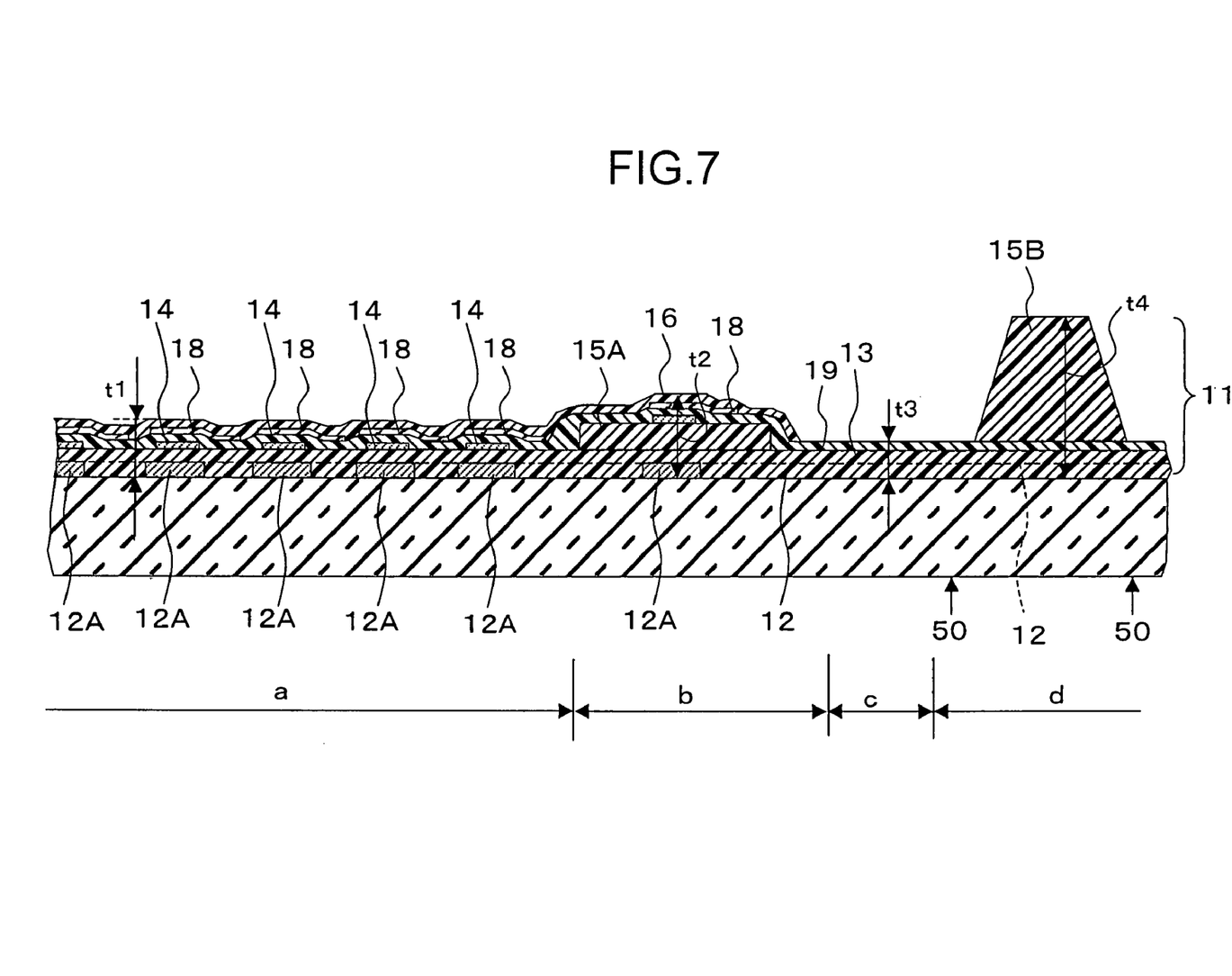
FIG. 7 is a section for explaining the mother substrate which is cut in a plane along a gate line through a TFT.

On the one-side face (hereinafter, called to as "pattern forming face") of the other mother substrate 100, there is formed a multi-layered film 11', as shown in FIG. 7. Thus multi-layered film 11' is composed of: (1) gate lines 12; (2) drain lines (not shown); (3) an insulating film 13 covering as the upper layer above the gate lines 12 the pattern forming face side of the mother substrate 100 entirely; (4) an amorphous silicon film 14 of the TFTs formed at positions confronting the terminals 12A of the gate lines 12 in the regions a across the insulating film 13; (5) an amorphous silicon film 14A formed at positions confronting the terminals 12A of the gate lines 12 in the regions b across the insulating film 13; (6) an organic film (or an inorganic film) 15A interposed only between the amorphous silicon film 14 and the insulating film 13 in the individual regions b; (7) a protective film 19 covering as the upper layer above the amorphous silicon film 14 the pattern forming side of the mother substrate 100 entirely; (8) transparent electrodes 18 formed at positions confronting the amorphous silicon film 14 across the protective film 19; (9) an alignment layer 16 covering as the upper layer above the transparent electrodes 18 the regions a and b; and (10) an organic film (or an inorganic film) 15B formed in the cut regions d along the individual sides of the regions b so that the film thickness t4 in the cut regions d is larger than that t2 in the regions b.

This multi-layered film 11' contains the organic film (or the inorganic film) 15A existing only in the regions b so that its film thickness is larger in the regions b than in the regions a. Moreover, the multi-layered film 11' contains the organic film (or the inorganic film) 15B formed only in the cut regions d so that its thickness is far larger in the cut regions d than in the regions b.

Figure 8:
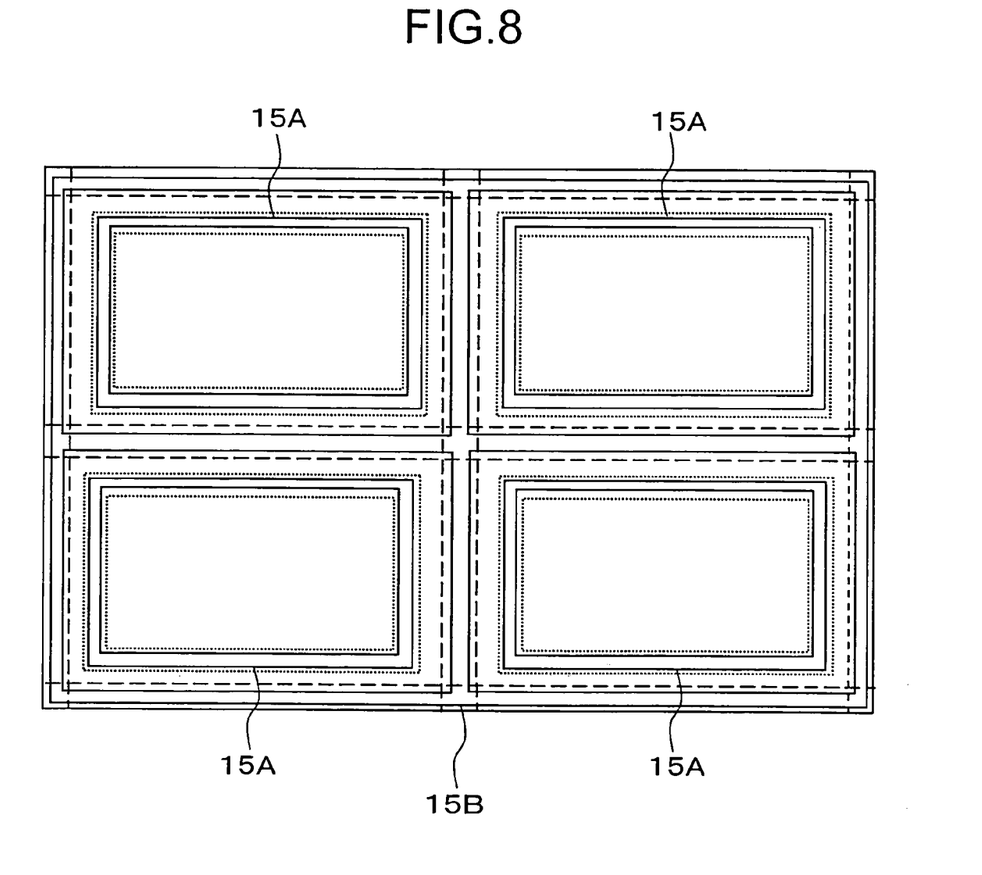
FIG. 8 is a diagram for explaining the regions, in which organic films (or inorganic films) are formed in a pattern forming plane of the mother substrate.

Here, the organic film (or the inorganic film) 15A may have a frame-shaped pattern (excepting the liquid crystal injection port) enclosing the regions a, as shown in FIG. 8, or may have a circular or rectangular pattern formed only at positions confronting the individual post-shaped films 25 of the other mother substrate 20'. Likewise, the organic film (or the inorganic film) 15B may have a frame-shaped pattern enclosing the regions b, as shown in FIG. 8, or may have a circular or rectangular pattern formed only at positions confronting the individual post-shaped films 25 of the other mother substrate 20'.

Next, the sealant 30 of a thermoset or UV-set type containing the fibers 31 kneaded is applied (at S1) to the individual regions c (although the portion for the liquid crystal injection port is excluded) in the pattern forming face of either of those two mother substrates 100 and 200. The fibers 31 to be used have the diameter d satisfying the following conditions:

$$(t2+T2)-(T3+t3)<d\leq(T4+t4)-(T3+t3).$$

Here:

T2: the film thickness of the multi-layered film 21' at the positions of the post-shaped films 25 in the regions b;

T3: the film thickness of the multi-layered film 21' in the regions c;

T4: the film thickness of the multi-layered film 21' at the positions of the post-shaped films 25 in the cut regions d;

t2: the film thickness of the multi-layered film 11' at the positions of the post-shaped films 25 in the regions b;

t3: the film thickness of the multi-layered film 11' in the. regions c; and t4: the film thickness of the multi-layered film 11' in the cut regions d.

In order to prepare the liquid crystal panel having a screen size of 28 inches, image non-display regions B of a width of 5 cm and sealant forming regions of 1 cm, for example, the post-shaped film in the regions d is placed at a position of about 4 cm from the boundary between the regions c and the regions d. Then, it is desired to fix the thickness of each component films forming the individual multi-layered films 11' and 21' such that: (t2+T1)=about 2.10 µm; (T2+t3)+d=about 12.30 µm; (T3+t4)=about 12.80 µm; and (h2−h1) =0.5 µm or less.

Figure 9:
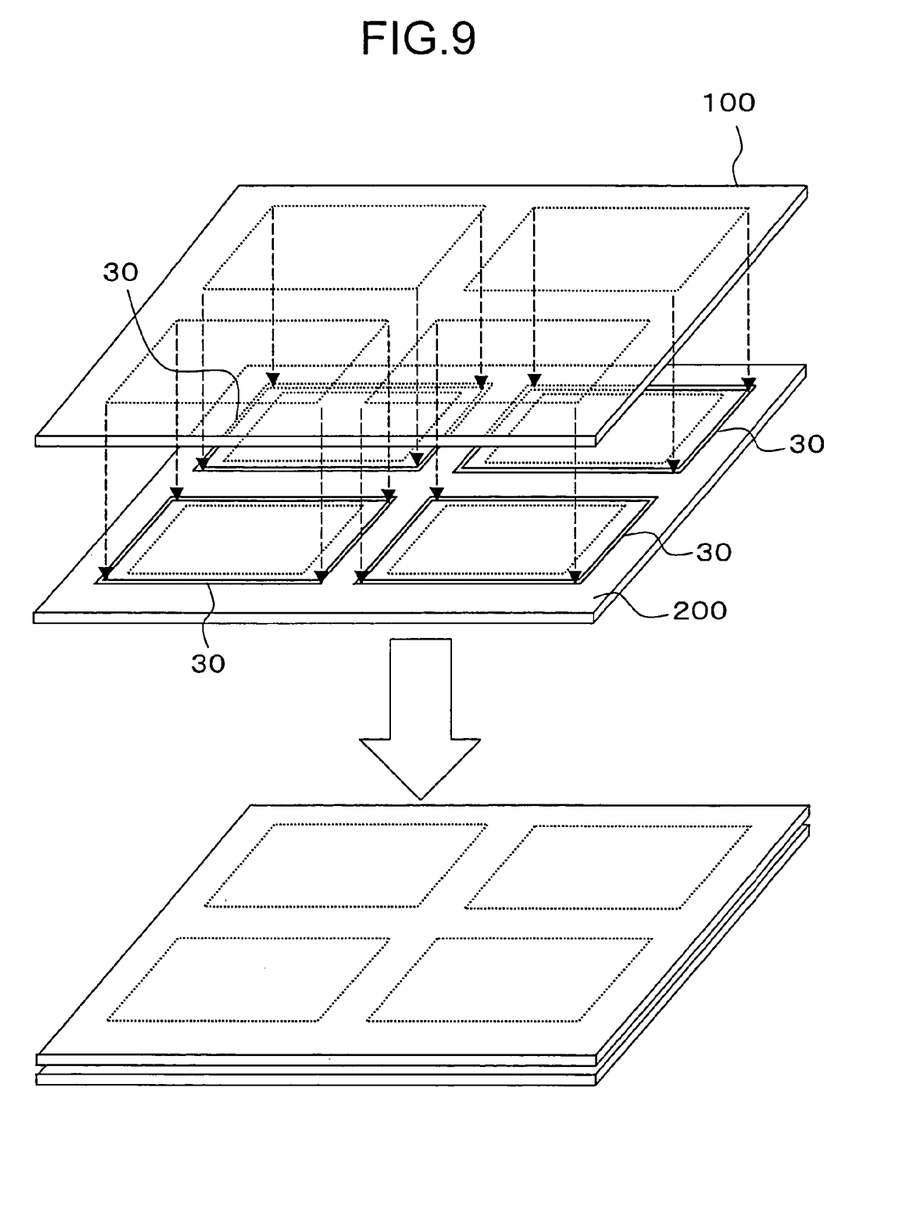
FIG. 9 is a diagram for explaining a process for assembling the mother substrates.
Figure 10:
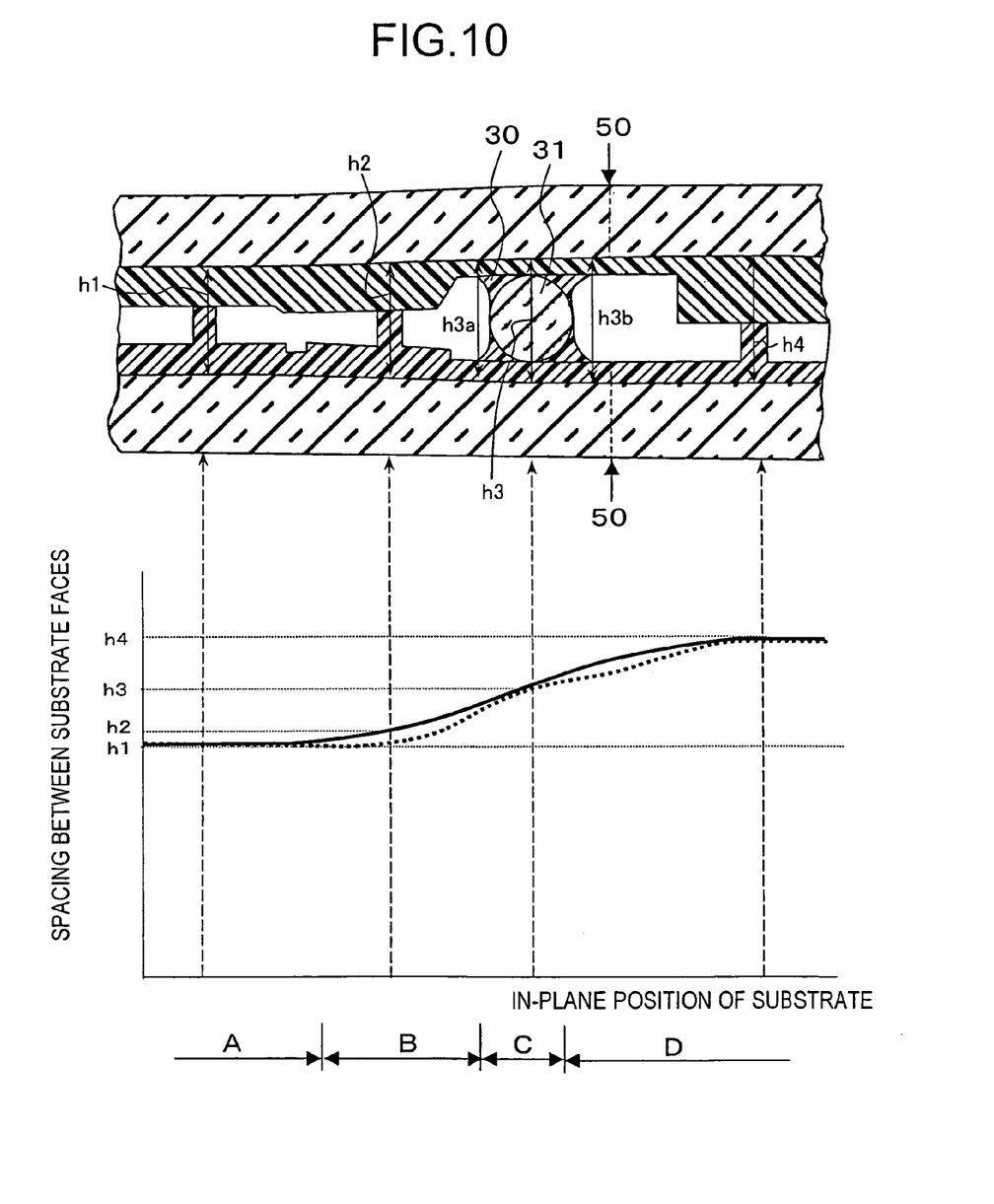
FIG. 10 is an explanatory diagram showing the spacing between the two mother substrates in a manner to correspond to the schematic section of the two mother substrates assembled.

After this, the individual panel regions are positioned, as shown in FIG. 9, to superpose the pattern forming faces of the two mother substrates 100 and 200. Moreover, the sealant 30 is set (at S2) by heating it or by irradiating it with an ultraviolet ray while applying a load to the two superposed mother substrates 100 and 200 in the direction to press the contact face between the multi-layered films 11' and 21'. As a result, the two mother substrates 100 and 200 are fixed, as indicated by a broken curve in FIG. 10, such that the individual image display regions A or the like bend convexly to the other substrate and such that cut regions D bend convexly outward.

When the load is then released, the sealant forming portions C of the two mother substrates 100 and 200 are constrained by the hardened sealant 30 while keeping their pressed shapes. As a result, the two mother substrates 100 and 200 are fixed to satisfy the following Relations (4), as indicated by a solid curve in FIG. 10.

$$h1<h2<h3<h4 \quad (4).$$

Here:

h1: the spacing (=t1+T1) of the pattern forming faces at the protrusion positions in the regions a;

h2: the spacing (=t2+T1) of the pattern forming faces at the protrusion positions in the regions b;

h3: the spacing (=t3+T2+d) of the pattern forming faces in the regions c; and h4: the spacing (=t4+T3) of the pattern forming faces in the cut regions d.

After this, the mother substrates 100 and 200 are divided into individual liquid crystal panels by cutting them along the cutting plane lines 50 (at S3). Then, the inside (i.e., the space between the two transparent substrates, enclosed by the sealant 30) of the individual liquid crystal panels is filled with the liquid crystal (at S4), and the liquid crystal injection port is sealed with a sealing material (at S5).

As a result, it is possible to manufacture the liquid crystal panel having the structure, as shown in FIG. 1 and FIG. 2. Moreover, the liquid crystal panels are subjected to a predetermined treatment and are inserted into a casing, so that the liquid crystal display apparatus, as shown in FIG. 4, can be manufactured.

Here, the liquid crystal is injected into the individual liquid crystal panels after they are divided, but this sequence is not indispensable. For example, the two transparent substrates may be superposed after a necessary quantity of liquid crystal is applied to the pattern forming face of either transparent substrate.

Figure 11:
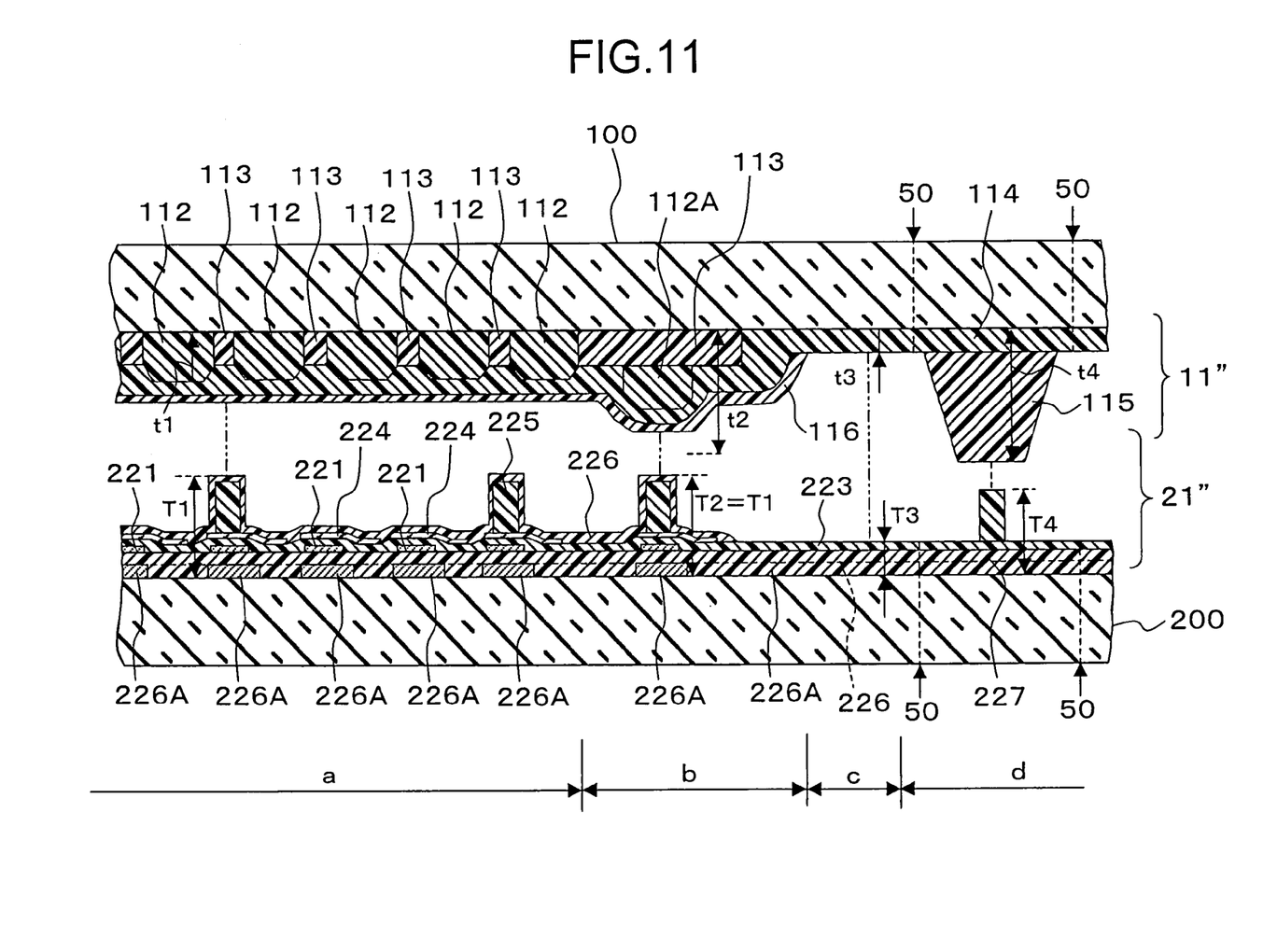
FIG. 11 is a diagram for explaining a section of a portion of the mother substrates.

Here, the multi-layered film containing the TFTs is made thicker in the image non-display regions B than in the image display regions A. However, the multi-layered film containing the color filter films may be made thicker in the image non-display regions B than in the image display regions A, as described hereinbefore. In this case, multi-layered films 11" and 21", as shown in FIG. 11, may be formed on the pattern forming faces of the two mother substrates 100 and 200.

The multi-layered film 11" of one mother substrate 100 is composed of: (1) RGB color filter films 112 disposed for individual sub-pixels in the regions a; (2) grid-shaped black matrix films 113 formed between the regions b and the color filter films 112; (3) a color filter film 112A formed on the black matrix film 112 in the regions b; (4) an overcoat film 114 covering the one face of the mother substrate 100 entirely as the upper layer film above the black matrix films 113 and the color filter films 112 and 112A; (5) an alignment layer 116 covering the overcoat film 114 in the regions a and b; and (6) an organic film (or an inorganic film) 115 along the individual sides of the regions b in the cut regions d.

The multi-layered film 21" of the other mother substrate 200 is composed of: (1) gate lines 226; (2) drain lines (not shown); (3) an insulating film 227 covering the gate lines 226; (4) an amorphous silicon film 221 of the TFTs formed at positions confronting the terminals 226A of the gate lines 226 across the insulating film 227; (5) a protective film 223 covering as the upper layer above the amorphous silicon film 221 the one side of the mother substrate 200 entirely; (6) transparent electrodes 224 formed at positions confronting the amorphous silicon film 221 across the protective film 223; (7) post-shaped films 225 formed of an organic substance or an inorganic substance at positions over the transparent electrodes 224 and in the regions d; (8) an alignment layer 226 covering as the upper layer above the post-shaped films 225 the regions a and b entirely.

The mother substrates 100 and 200 thus having the multi-layered films 11" and 21" formed are assembled like the aforementioned case. Then, it is possible to manufacture the liquid crystal panel having the two transparent substrates which are made to bend convexly to the liquid crystals by the pressure applied at the substrate assembling step.

Here, the shapes of the multi-layered films over the pattern forming faces of the individual mother substrates 100 and 200 need not be limited to the aforementioned ones, if the total film thicknesses of the multi-layered films interposed between the pattern forming faces of the mother substrates 100 and 200 at the contact positions of the multi-layered films over the pattern forming faces of the mother substrates 100 and 200 satisfy "the relations of the total film thickness in the regions a≦the total film thickness in the regions b<the total film thickness in the seal regions c≦the total film thickness in the cut regions d".

In the description thus far made, the spacing between the pattern forming faces of the mother substrates 100 and 200 is controlled by the thickness of the multi-layered films on the mother substrates 100 and 200. However, this control may not be made just in the aforementioned manner, if the spacing between the pattern forming faces of the mother substrates 100 and 200 can be controlled.

Figure 12:
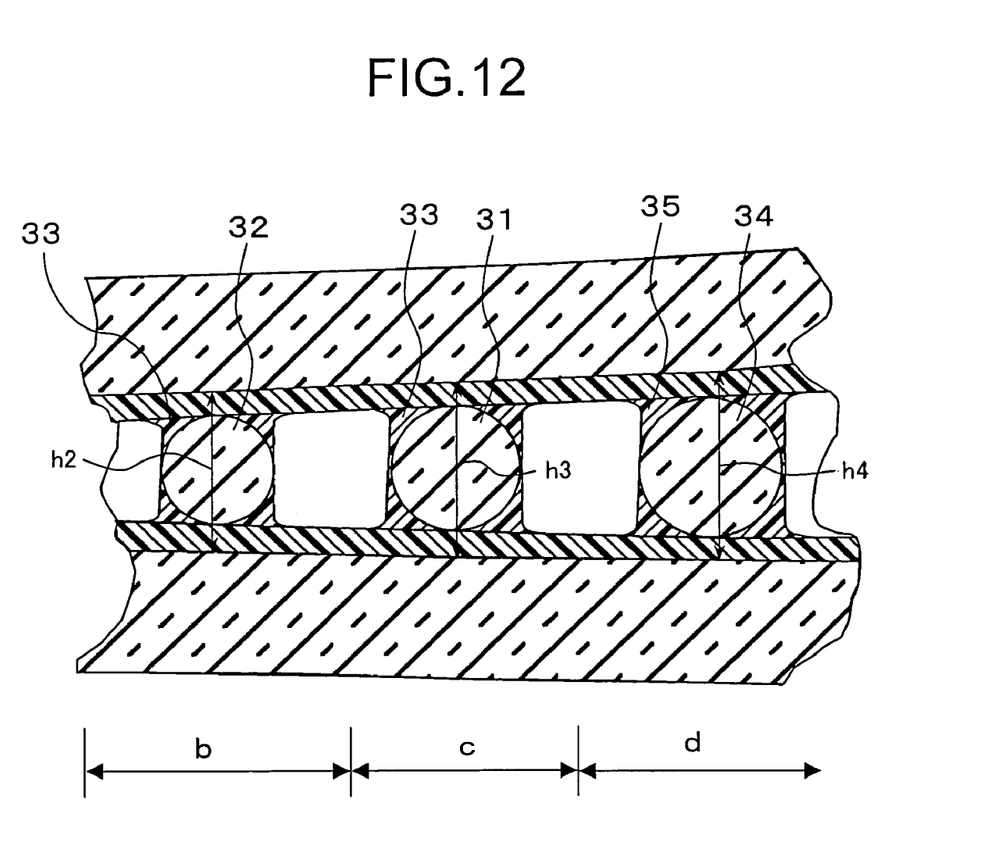
FIG. 12 is a schematic section for explaining a sealing portion in the two mother substrates assembled.

For example, the spacing between the pattern forming faces of the mother substrates 100 and 200 may be made to satisfy the Relations (4), as shown in FIG. 12, by applying a sealant 33 kneaded with fibers 32 radially smaller than the fibers 31 in the regions c to the regions band by applying a sealant 35 kneaded with fibers 34 radially larger than the fibers 31 in the regions c to the regions d.

Even if the temperature of the liquid crystal panels themselves is raised by the heat radiation from the back light during the operation of the liquid crystal display apparatus, as has been described hereinbefore, it is possible to suppress the resultant mura defect effectively.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A liquid crystal display apparatus comprising:
   a first substrate on which a first film formed;
   a second substrate which is opposite to said first substrate and which has a surface facing said first substrate, a second film having a first protrusion contacting with said first film being formed on said surface;
   a frame-shaped sealant interposed between said first and second substrates and along the edges of said first and second substrates; and
   a liquid crystal layer enclosed by said frame-shaped sealant and formed in a space between said first and second films which becomes narrower toward the boundary between said liquid crystal layer and said sealant from the edges of said first and second substrates;
   wherein said second film includes a second protrusion at a position between said first protrusion and said sealant, and said first film is made thicker at the positions confronting said second protrusions than at positions confronting said first protrusions.

2. A liquid crystal display apparatus according to claim 1, wherein said second film includes a second protrusion having an end portion at position more distant from the liquid crystal side of said first substrate than an end portion of said first protrusion.

3. A liquid crystal display apparatus according to claim 1, further comprising:
a first fiber disposed in and along said sealant and contacting with said first and second films; and
a second fiber disposed at a position closer to the side of said liquid crystal layer than a position of said first fiber and along said first fiber and contacting with said first and second films, and a diameter of which in the thickness direction of said first and second substrates is smaller than a diameter of said first fiber in the direction of said first and second substrates.

4. A liquid crystal display apparatus according to claim 1, further comprising:
a first fiber disposed in and along said frame-shaped sealant and contacting with said first and second films; and
a second fiber which is disposed at a position closer to said liquid crystal layer than a position of said first fiber and along said first fiber and contacting with said first and second films, and a diameter of which in the thickness direction of said first and second substrates is smaller than a diameter of said first fiber in the direction of said first and second substrates.

5. A liquid crystal display apparatus comprising:
a first substrate on which a first film formed;
a second substrate which is opposite to said first substrate and which has a surface facing said first substrate, a second film including a first protrusion contacting with said first film being formed on said surface;
a frame-shaped sealant interposed between said first and second substrates and along the edges of said first and second substrates; and
a liquid crystal layer enclosed by said frame-shaped sealer and formed in a space between said first and second films, said frame-shaped sealant fixing said first and second substrates with said first substrate bending convexly to said liquid crystal layer;
wherein said second film includes a second protrusion at a position between said first protrusion and said sealant, and said first film is made thicker at the position confronting said second protrusion than at position confronting said first protrusion.

6. A liquid crystal display apparatus comprising:
a first substrate on which a first film formed;
a second substrate which is opposite to said first substrate and which has a surface facing said first substrate, a second film including a first protrusion contacting with said first film being formed on said surface;
a frame-shaped sealant interposed between said first and second substrates and along the edges of said first and second substrates; and
a liquid crystal layer enclosed by said frame-shaped sealer and formed in a space between said first and second films, said frame-shaped sealant fixing said first and second substrates with said first substrate bending convexly to said liquid crystal layer;
wherein said second film includes a second protrusion having an end portion at position more distant from the liquid crystal side of said first substrate than an end portion of said first protrusion.

7. A liquid crystal display apparatus comprising:
a first substrate on which a first film formed;
a second substrate which is opposite to said first substrate and which has a surface facing said first substrate, a second film including a first protrusion contacting with said first film being formed on said surface;
a frame-shaped sealant interposed between said first and second substrates and along the edges of said first and second substrates;
a liquid crystal layer enclosed by said frame-shaped sealer and formed in a space between said first and second films, said frame-shaped sealant fixing said first and second substrates with said first substrate bending convexly to said liquid crystal layer;
a first fiber disposed in and along said frame-shaped sealant and contacting with said first and second films; and
a second fiber which is disposed at a position closer to said liquid crystal layer than a position of said first fiber and along said first fiber and contacting with said first and second films, and a diameter of which in the thickness direction of said first and second substrates is smaller than a diameter of said first fiber in the direction of said first and second substrates.

8. A method for manufacturing a liquid crystal display apparatus having liquid crystal panel, comprising:
a sealant applying step of applying a sealant to one of a first seal region of a first substrate enclosing a first region having protrusion and a second seal region of a second substrate enclosing a second region to confront said first region;
a substrate assembling step of hardening said sealant while said first region and said second region confronting each other and while said protrusion contacting with said second region, with at least one of a region containing said first region and said first seal region and a region containing said second region and said second seal region bending convexly to the other; and
a substrate cutting step of cutting said first and second substrates along said sealant into a shape of said liquid crystal panel.

9. A liquid crystal display apparatus manufacturing method according to claim 8,
wherein said sealant is hardened while said protrusion contacting with said second region, in state that a first intervening member is interposed between surfaces of said first and second substrates in a region on the opposite side of said protrusion across said sealant, said first intervening member making a spacing between said surfaces of said first and second substrates wider at a position on the opposite side of said protrusion across said sealant than a spacing between said surfaces of said first and second substrates at a position of said protrusion at said substrate assembling step.

10. A liquid crystal display apparatus manufacturing method according to claim 8,
wherein said sealant is hardened while said protrusion contacting with said second region, in state that a second intervening member thinner than said first intervening member in the thickness direction of said first and second substrates is interposed between said surfaces of said first and second substrates in a region between said protrusion and said sealant, said second intervening member making a spacing between said surfaces of said first and second substrates wider at a position between said protrusion and said sealant than a spacing between said surfaces of said first and second substrates at position of said protrusion at said substrate assembling step.

11. A liquid crystal display apparatus manufacturing method according to claim 9,
wherein said first intervening member includes a first film formed on the surface of said first substrate, and a second film formed on the surface of said second substrate.

12. A liquid crystal display apparatus manufacturing method according to claim 10,
wherein said first and second intervening members include a first film formed on the surface of said first substrate, and a second film formed on the surface of said second substrate.

13. A liquid crystal display apparatus manufacturing method according to claim 8,
wherein said protrusion is formed on said first film.

14. A liquid crystal display apparatus manufacturing method according to claim 9,
wherein said first intervening member includes a first fiber, and said second intervening member includes second fiber having a diameter smaller in the thickness direction of said first and second substrates than a diameter of said first fibers.

* * * * *